No. 690,819.  
W. C. ANDERSON.  
HOSE MENDER.  
(Application filed Jan. 7, 1901. Renewed Nov. 2, 1901.)  
Patented Jan. 7, 1902.
(No Model.)
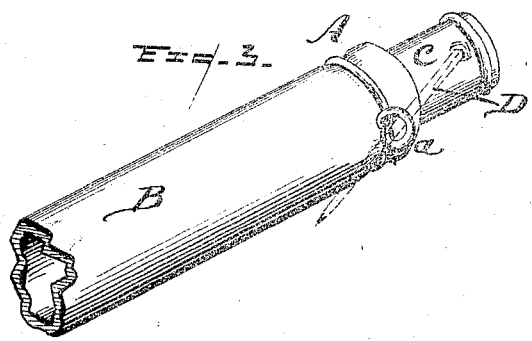
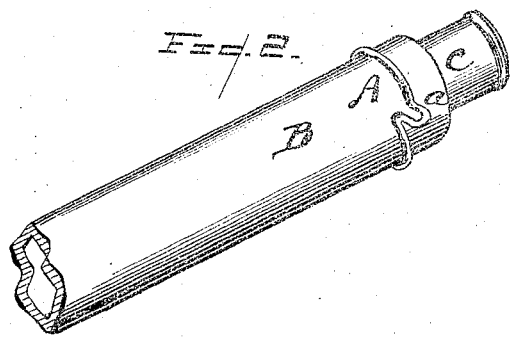
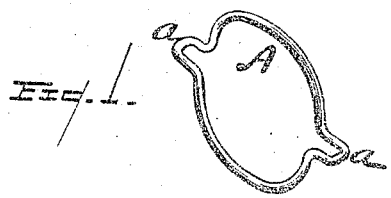

UNITED STATES PATENT OFFICE.

WILLIAM C. ANDERSON, OF DETROIT, MICHIGAN, ASSIGNOR TO BUCKLEY-HART MANUFACTURING COMPANY, OF DETROIT, MICHIGAN, A CORPORATION.

HOSE-MENDER.

SPECIFICATION forming part of Letters Patent No. 690,819, dated January 7, 1902.

Application filed January 7, 1901. Renewed November 2, 1901. Serial No. 80,913. (No model.)

*To all whom it may concern:*

Be it known that I, WILLIAM C. ANDERSON, a citizen of the United States, residing at Detroit, in the county of Wayne and State of Michigan, have invented new and useful Improvements in Hose-Menders, of which the following is a specification.

My invention consists of a device for readily mending flexible hose, such as rubber garden-hose, &c.; and it consists generally of a metal ring or annulet, made of suitable material, large enough to readily fit around the hose to be mended and provided with suitable lugs or loops formed therein, by which it may be conveniently tightened upon the hose by means of an ordinary nail or other simple implement.

The annexed drawings show a simple form of my invention as applied to the mending of an ordinary section of garden-hose.

Figure 1 represents the metal ring or annulet by itself. Fig. 2 shows the same as placed in position upon the hose and ready to be tightened into position, and Fig. 3 shows the same when finally tightened into place.

In the drawings, A represents the ring or annulet, composed of copper wire or other suitable material; $a\,a$, the lugs or loops formed in the same for the purpose of tightening the ring in place after adjustment; B, a section of hose, and C the ordinary section of metal tubing used in repairing such hose.

D represents the nail used in tightening up the ring in place after adjustment.

The method of using my device is as follows: The metal tubing being placed inside the hose, the ring or annulet is slipped over the hose, near the end thereof and so as to be over the section of metal tubing and inside the projecting rim on the end thereof, as shown in Fig. 2. A nail of suitable size to be used as a lever or any other suitable implement of the kind is then inserted in one of the loops or lugs $a\,a$ and turned so as to tighten the ring upon the hose and prevent the latter from slipping from the section of metal tubing C, as shown in Fig. 3. This operation is repeated with the other lugs until the section of hose is sufficiently secured. It will be observed that the loops or lugs $a\,a$ project outwardly from the circumferential plane of the ring, so that when the ring is applied to a hose a nail or like instrument can be freely inserted in one (if only a single one be employed) or both of said loops or lugs, so as to twist the same and constrict the ring on the hose. It will be seen that the ring is in two portions, lying, respectively, in different planes, and that the branches of the loops $a\,a$ (shown as U-shaped) extend outward from these portions. The loops or lugs may then, if desired, be flattened down onto the hose with a hammer or other implement, so as to be out of the way and prevent their catching when the hose is moved.

While I have shown the ring or mender as provided with two lugs or loops, it is obvious that no particular number of the same is essential to my invention, the form shown, however, being found from my experience to be a desirable and suitable one. It is also obvious that the size of the ring A should be so adapted to the size of the hose to be mended as to permit it to be readily adjusted to the same, while yet being small enough to avoid unnecessary labor in tightening the same in place. It is also obvious that the size and quality of the metal used in the ring and the size of the loops or lugs $a\,a$ should be adapted to ready and convenient use.

I am aware, of course, that it has been customary to mend sections of hose by winding copper wire or other wire around the same and then twisting the ends together with pliers, so as to tighten the wire around the hose, and I do not claim, broadly, the use of wire or other similar material in the mending of hose by tightening the same around the hose; but I am not aware that a device similar to that shown and explained by me has ever been used, and I do claim, broadly, as a new device for mending hose a continuous ring, composed of copper wire or other suitable material, adapted to the size of the hose to be mended and provided with suitable lugs or loops therein to admit of the ready tightening of the same in place by use of a nail or other simple instrument.

Having thus described my improvement, what I claim as my invention, and desire to secure by Letters Patent, is—

A device for mending hose consisting of a ring in two portions lying in different planes, said ring having a U-shaped lug, the branches of which are connected to the respective portions of said ring.

WILLIAM C. ANDERSON.

Witnesses:
   DAVID T. MARANTETTE,
   AMELIA WILLIAMS.